United States Patent [19]
Kaplan

[11] 3,880,273
[45] Apr. 29, 1975

[54] AUTOMATIC STACKING MACHINE FOR BARS AND THE LIKE

[76] Inventor: Irving Leonard Kaplan, 15 Brandywood Dr., Pepper Pike, Ohio 44124

[22] Filed: Mar. 2, 1973

[21] Appl. No.: 337,649

[52] U.S. Cl.................. 198/34; 198/37; 214/1 PB
[51] Int. Cl........................................ B65g 47/26
[58] Field of Search............. 198/20, 21, 29, 27, 30, 198/34, 219, 222, 37; 214/1 P, 1 PB

[56] References Cited
UNITED STATES PATENTS

| | | | |
|---|---|---|---|
| 1,976,855 | 10/1934 | McKee et al. | 198/20 |
| 2,954,863 | 10/1960 | Staples | 198/20 |
| 2,986,262 | 5/1961 | Powers | 198/29 |
| 3,039,585 | 6/1962 | Francis | 198/20 |
| 3,075,630 | 1/1963 | Fisk | 198/37 |
| 3,217,859 | 11/1965 | Bartlo et al. | 198/34 |
| 3,752,295 | 8/1973 | Hubbell et al. | 198/34 |

*Primary Examiner*—Evon C. Blunk
*Assistant Examiner*—Joseph E. Valenza
*Attorney, Agent, or Firm*—Isler & Ornstein

[57] ABSTRACT

An automatic stacking machine or stacker is provided for stacking bars and various shapes, such as angles, into bundles, preparatory to strapping or tying the bundles, for shipment or storage. The bars are fed singly on power-driven chains against fixed stops, so as to provide a compact layer or charge, which is then transferred by means of pre-charge carriages to a second set of power-driven chains. This second set of chains transfers the charge against a second set of stops, after which the charge is transferred by stacking carriages or magnetic turnover arms onto stacking cradles, to form a bundle of bars. The bundles are strapped or tied together by means of automatic strappers positioned alongside the stacking cradles.

7 Claims, 38 Drawing Figures

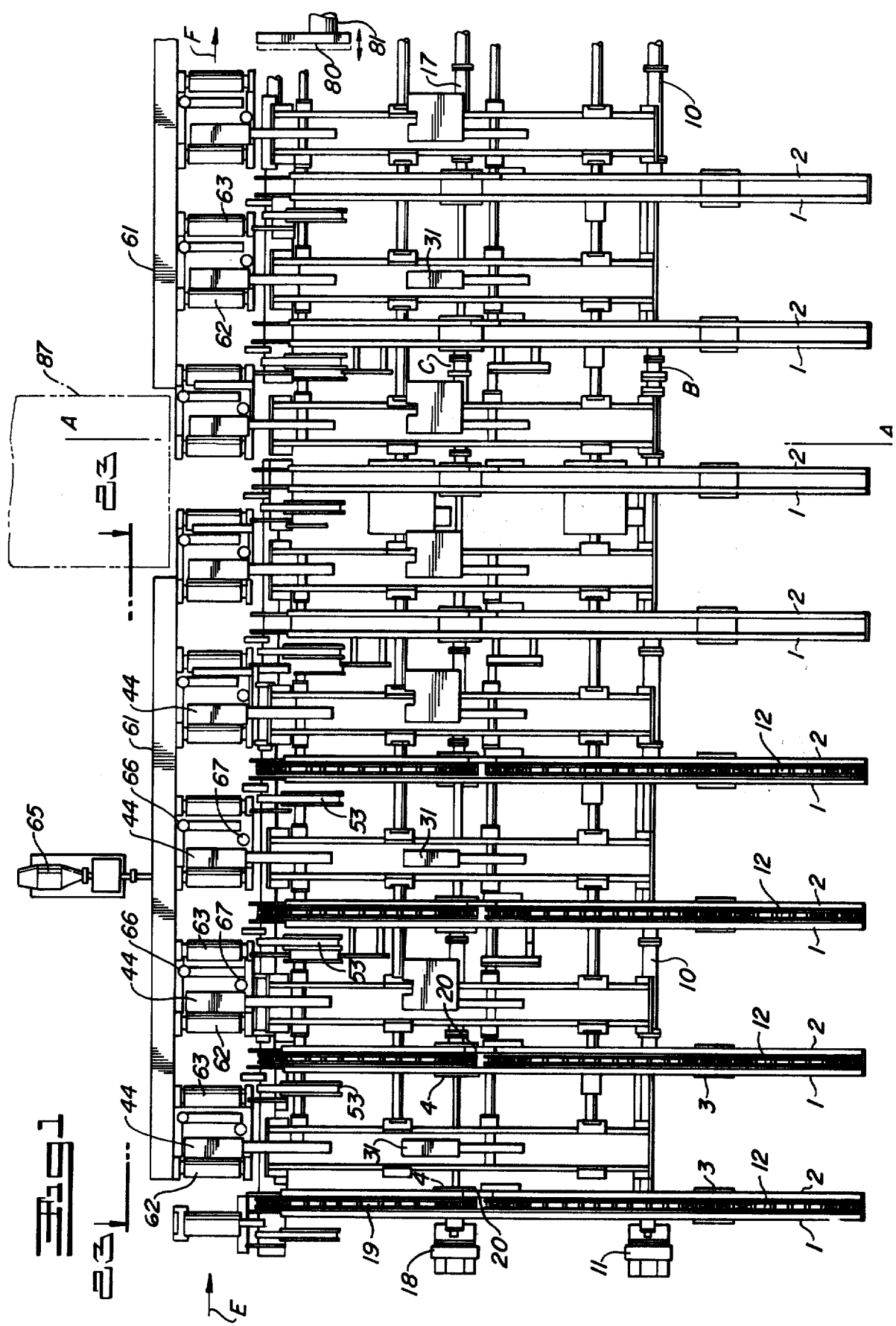

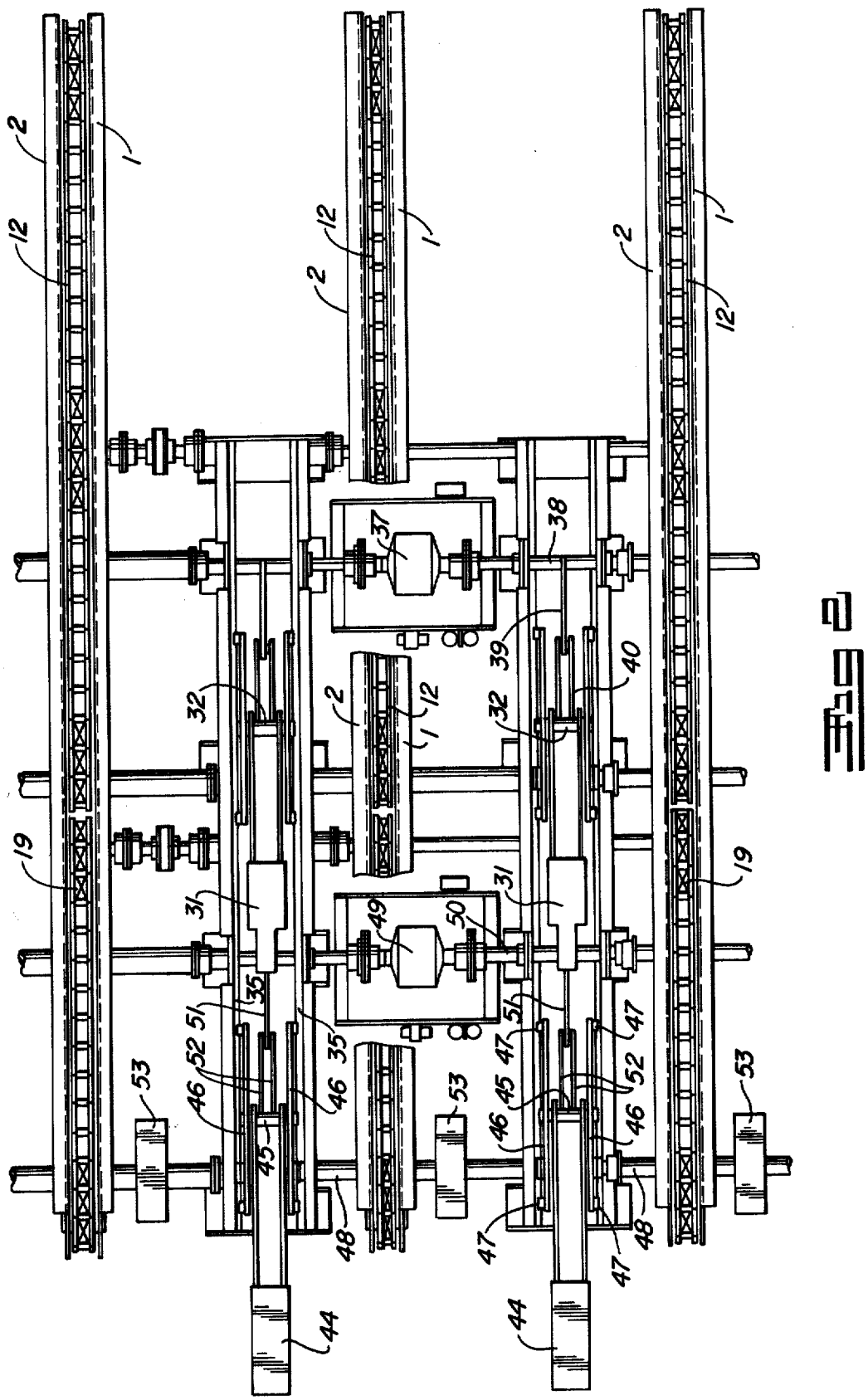

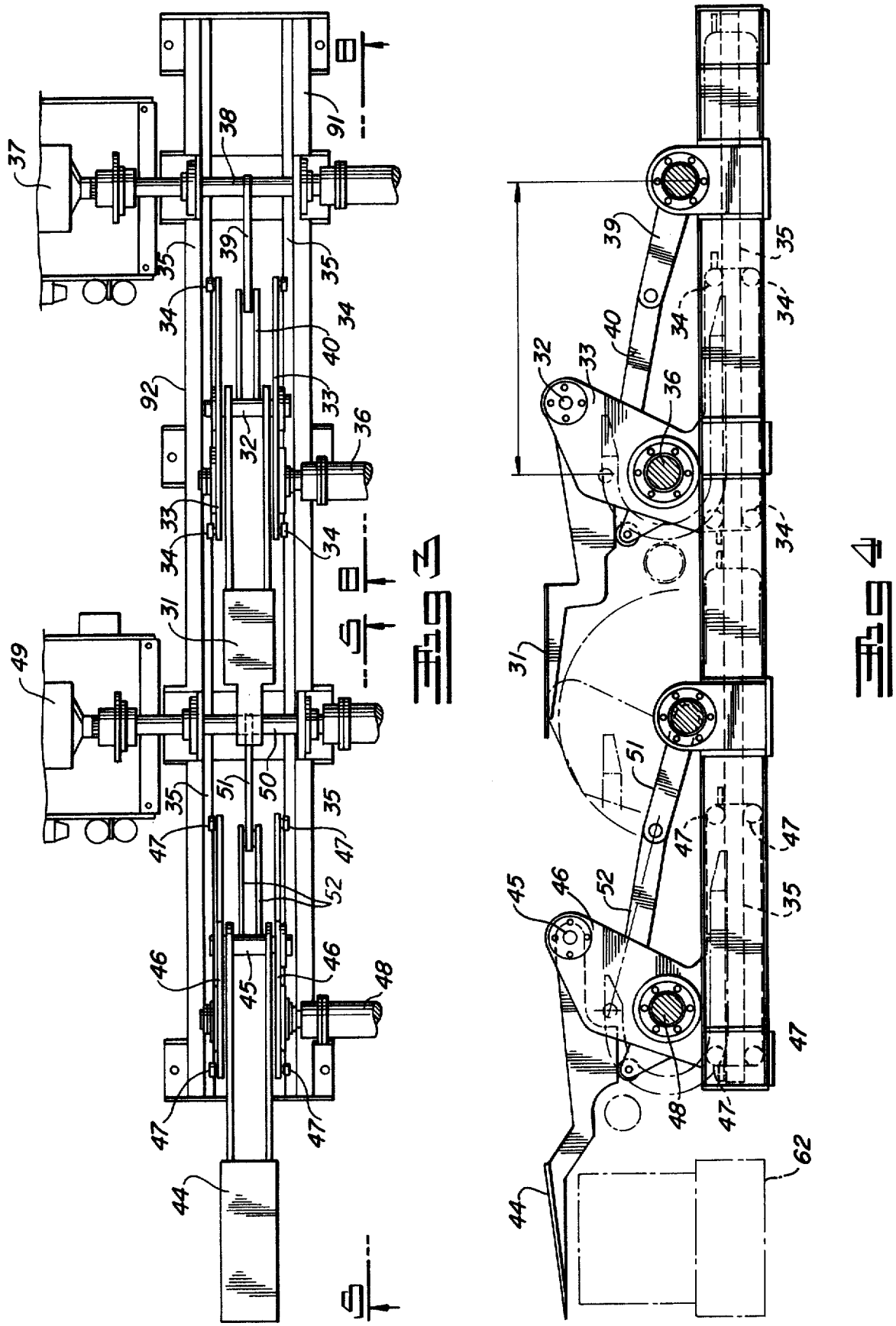

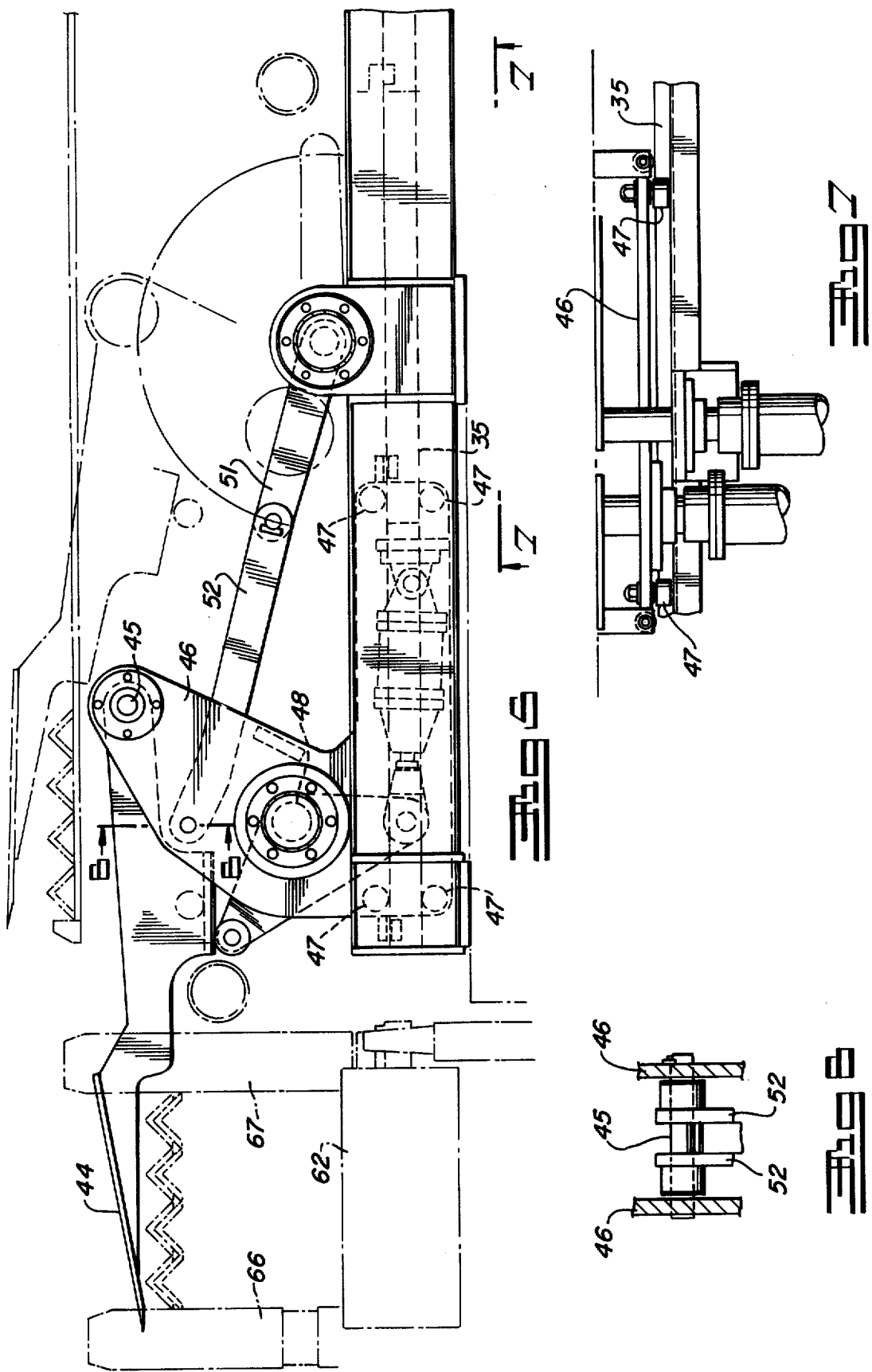

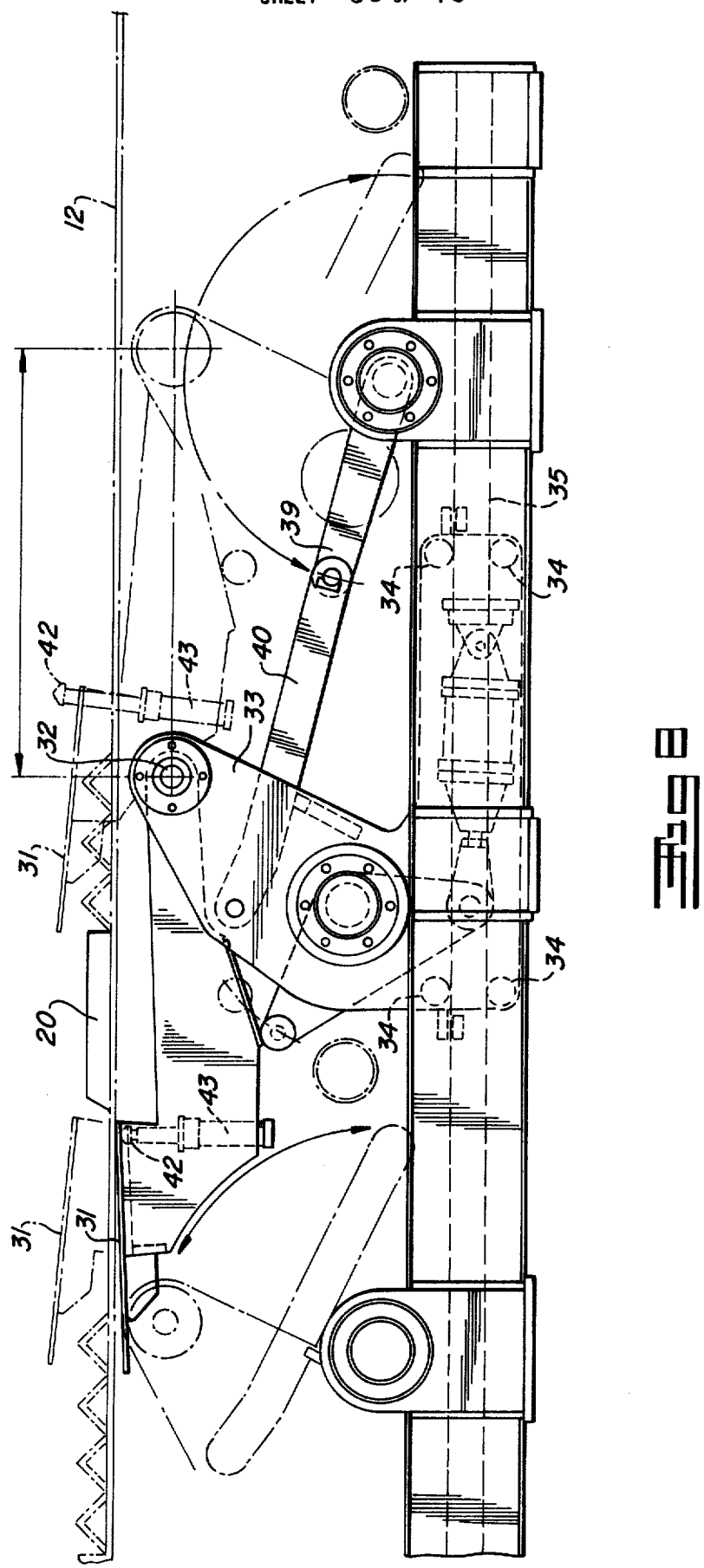

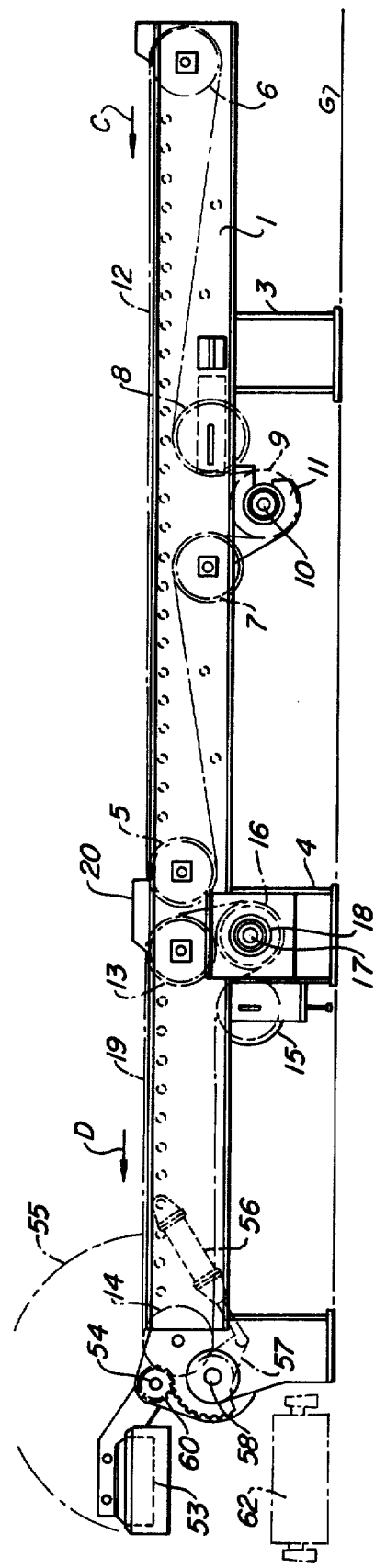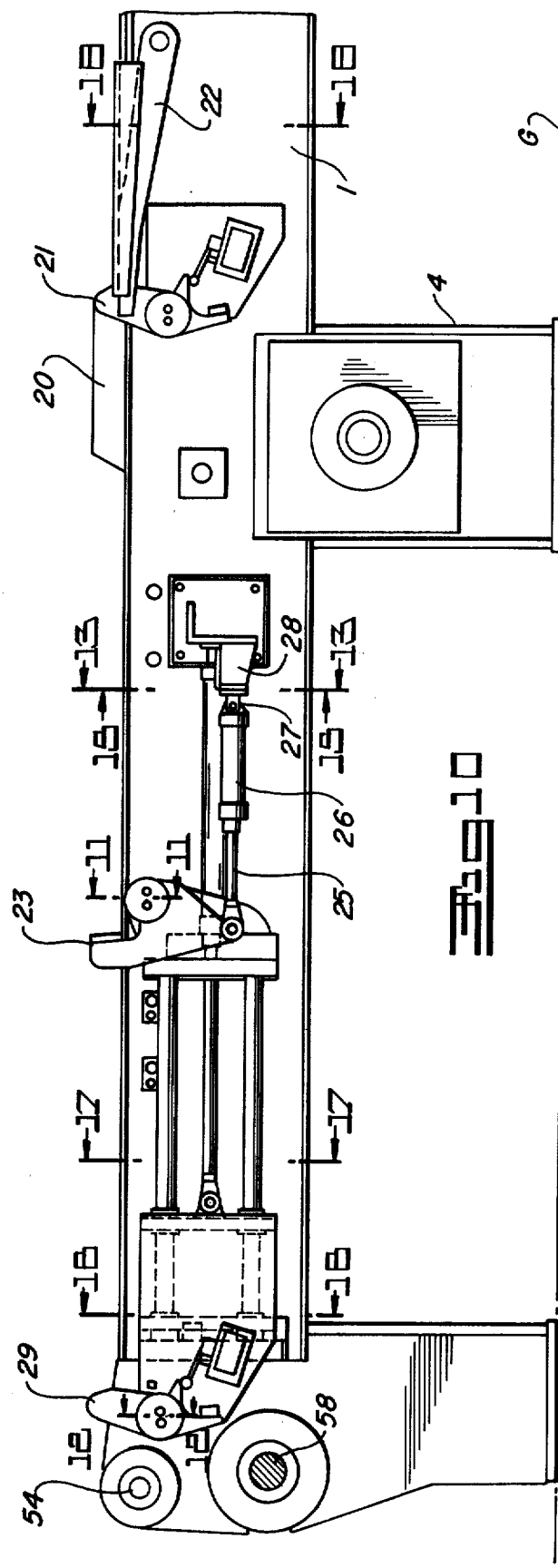

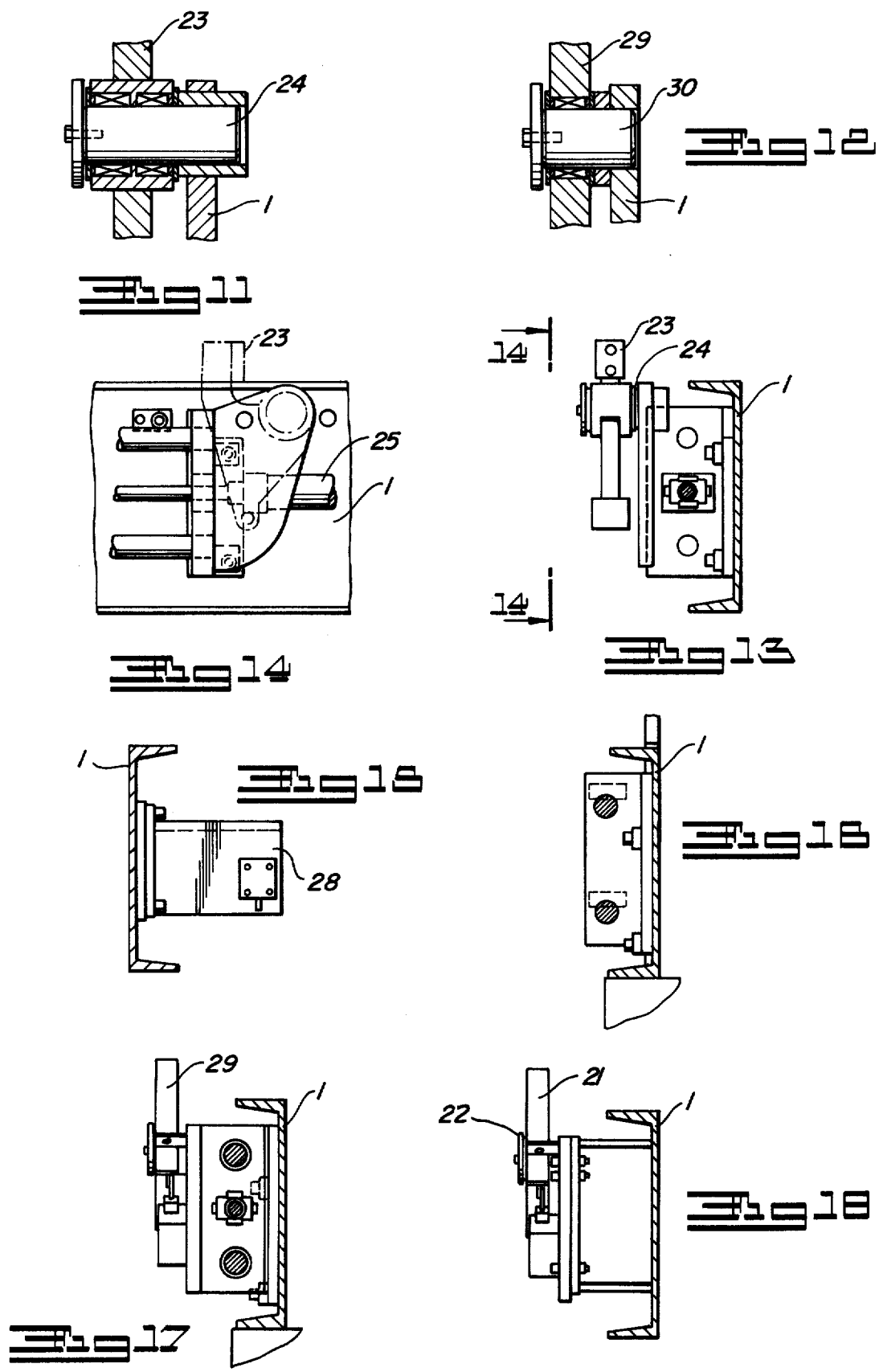

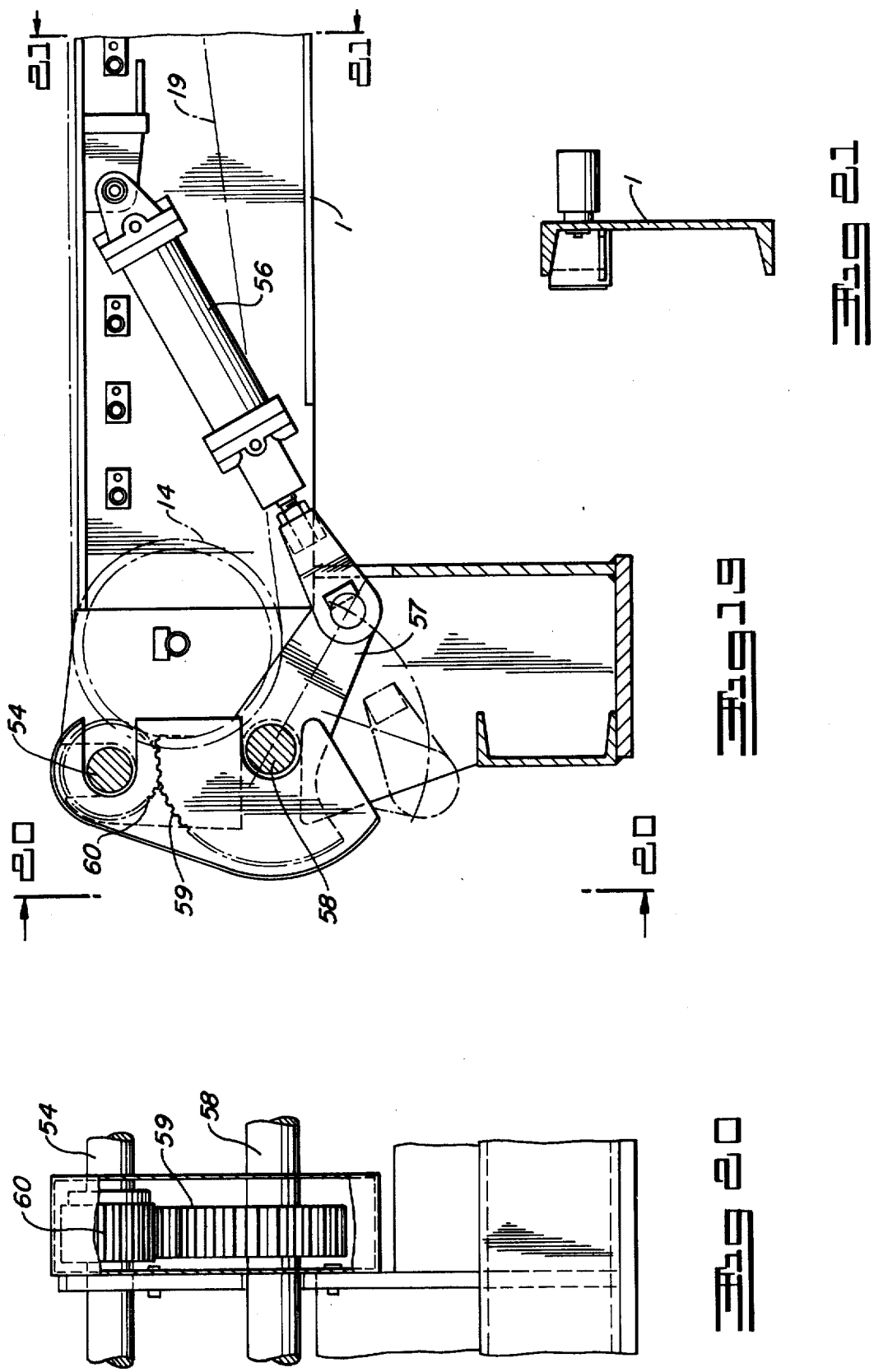

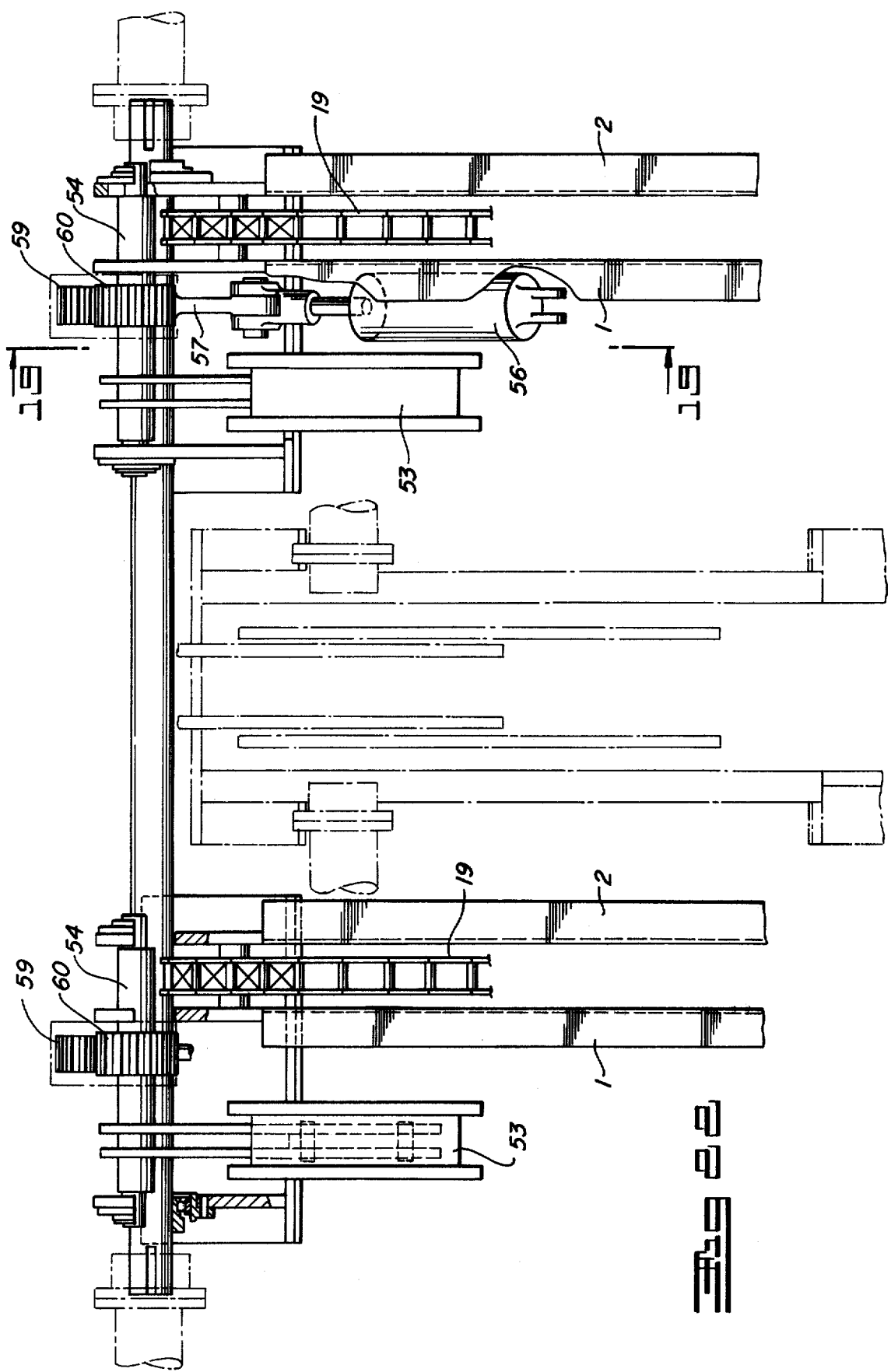

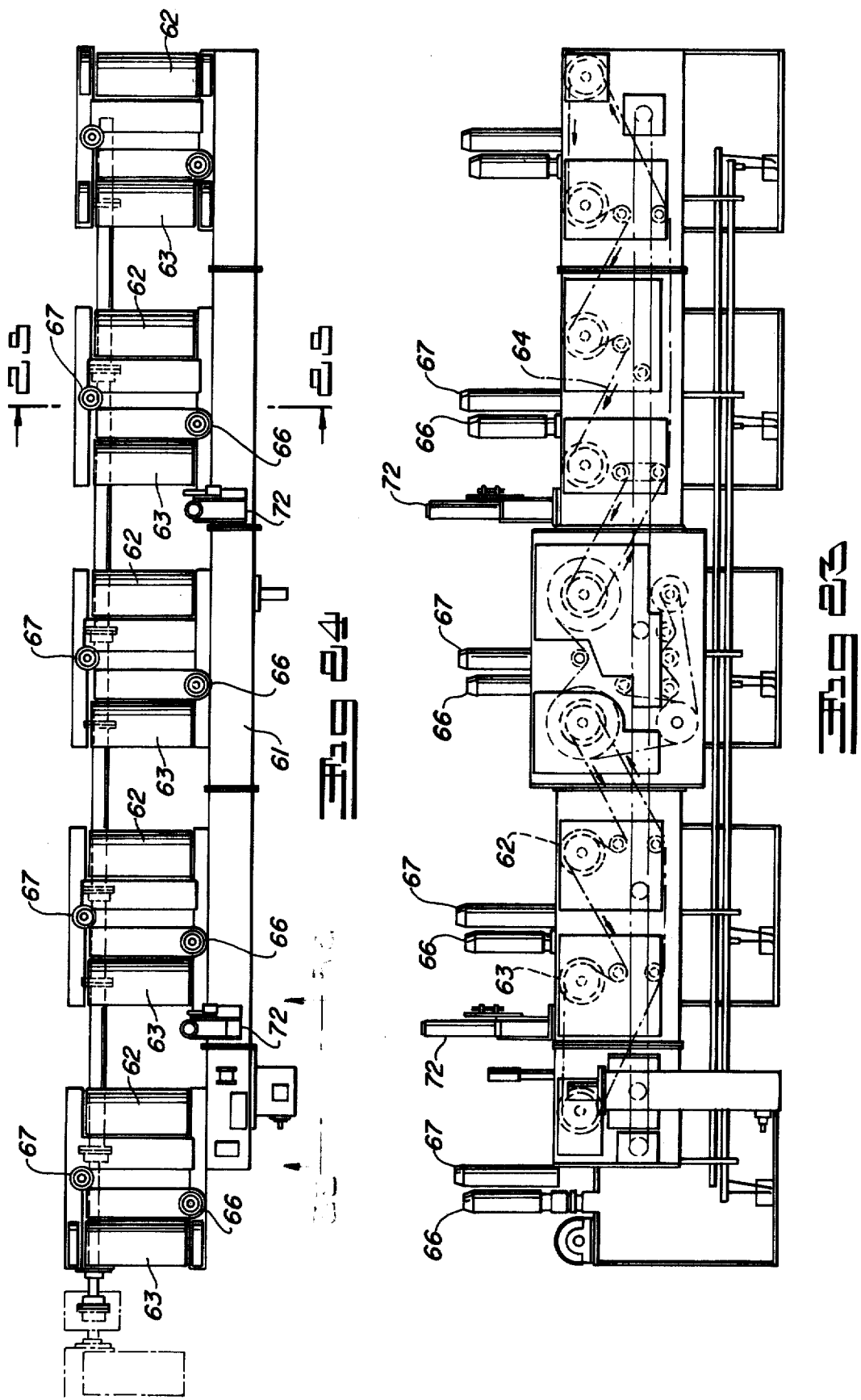

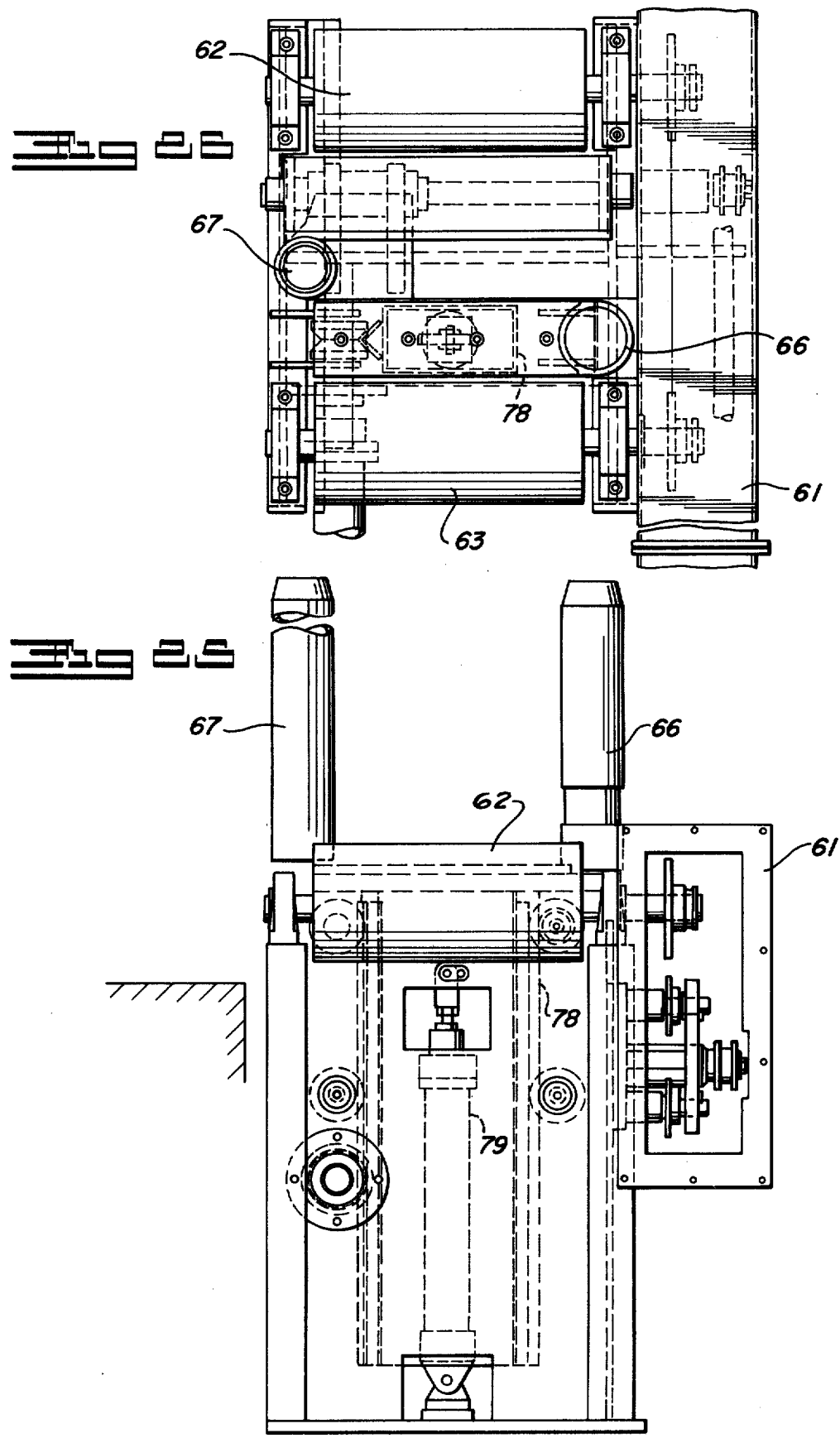

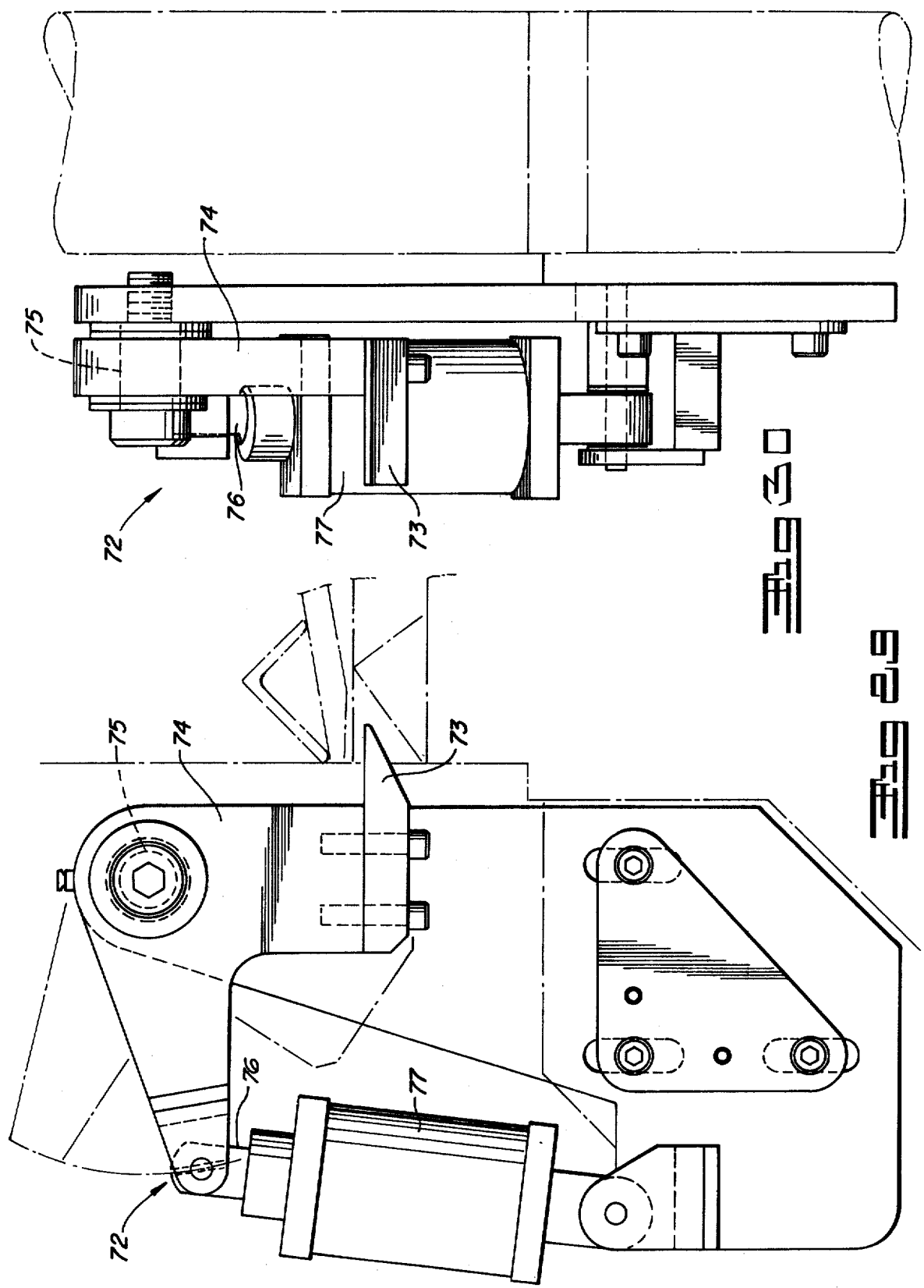

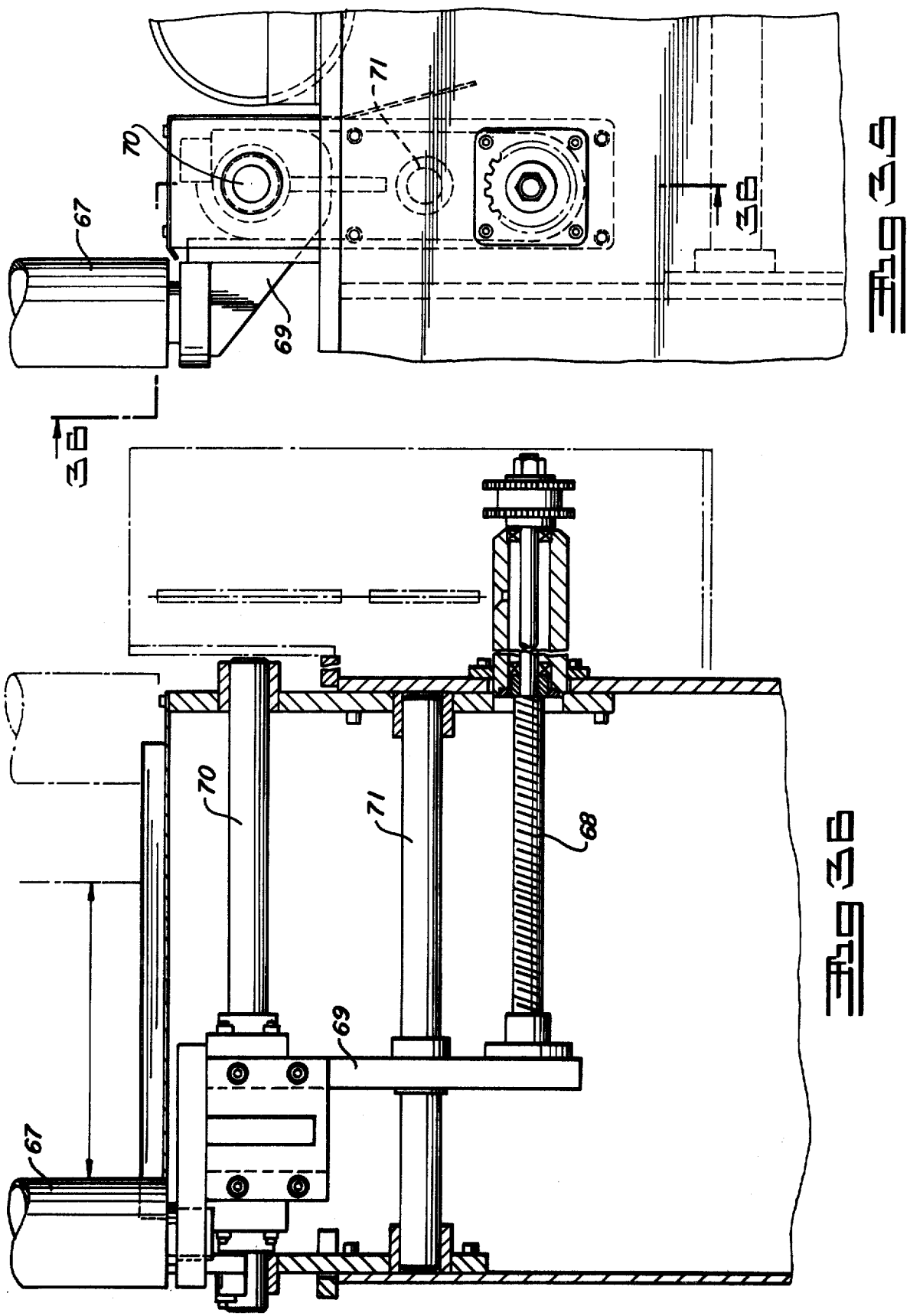

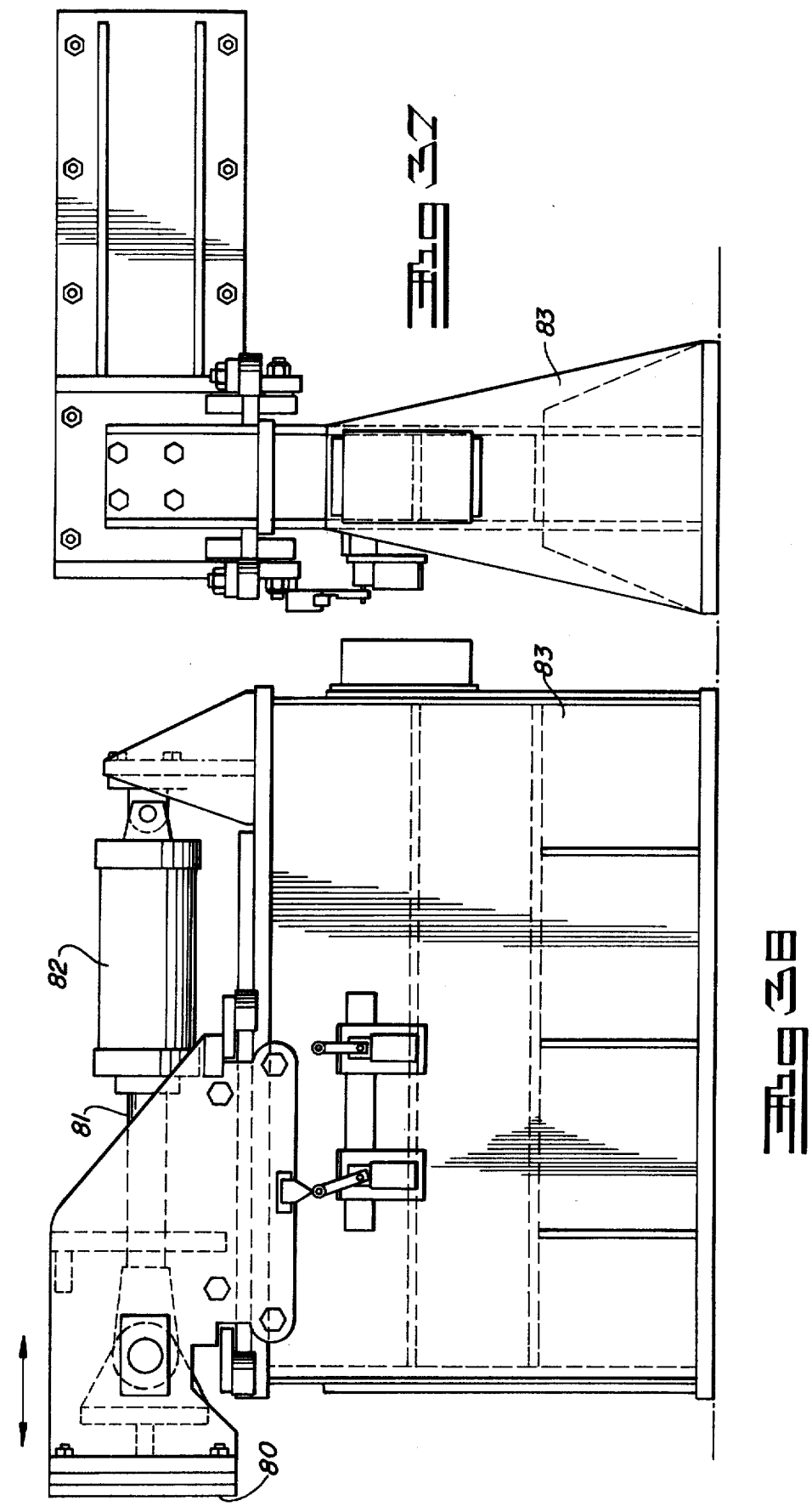

3,880,273

AUTOMATIC STACKING MACHINE FOR BARS AND THE LIKE

This invention relates, as indicated, to an automatic stacking machine for bars and the like.

A primary object of the invention is to provide a machine of the character described having means for automatically accumulating single bars into a compact row or charge of such bars, to facilitate further handling of the bars.

Another object of the invention is to provide a machine of the character described embodying precharge carriages for transferring the charges onto a set of power-driven chains and against a set of stops for further compacting.

A further object of the invention is to provide a machine of the character described embodying stacking carriages for transferring the charges onto stacking cradles, in which the charges are stacked to form bundles which are strapped for shipment or storage.

A still further object of the invention is to provide a machine of the character described having magnetic turnover arms for transferring certain charges to the stacking cradles.

Other objects and advantages of my invention will be apparent during the course of the following description.

In the accompanying drawings forming a part of this specification, and in which like numerals are employed to designate like parts throughout the same, FIG. 1 is a plan view of the automatic stacker, with portions thereof at the right end of the machine omitted, due to limitations of space;

FIG. 2 is a fragmentary plan view, on a slightly enlarged scale, showing several lateral chain transfers, precharge carriages, stacking carriages, and drives therefor;

FIG. 3 is a view similar to FIG. 2, but on a somewhat larger scale, showing one of the precharge carriages and one of the stacking carriages;

FIG. 4 is a side elevational view of the parts shown in FIG. 3, as viewed from the lower end of FIG. 3;

FIG. 5 is a side elevational view, on an enlarged scale, as viewed in the direction indicated by the line 5—5 of FIG. 3, of the stacking carriage, in extended position;

FIG. 6 is a fragmentary cross-sectional view, taken on the line 6—6 of FIG. 5;

FIG. 7 is a fragmentary bottom plan view, of the stacking carriage, as viewed in the direction indicated by the line 7—7 of FIG. 5;

FIG. 8 is a side elevational view, on an enlarged scale, as viewed in the direction indicated by the line 8—8 of FIG. 3, of the precharge carriage, in fully extended position;

FIG. 9 is a side elevational view showing the powered lateral chain transfer and magnetic turnover arm;

FIG. 10 is a side elevational view showing the fixed stop, disappearing stop, and power positioning stop;

FIG. 11 is a fragmentary cross-sectional view, taken on the line 11—11 of FIG. 10;

FIG. 12 is a fragmentary cross-sectional view, taken on the line 12—12 of FIG. 10;

FIG. 13 is a fragmentary cross-sectional view, taken on the line 13—13 of FIG. 10;

FIG. 14 is a fragmentary side elevational view, as viewed in the direction indicated by the line 14—14 of FIG. 13;

FIG. 15 is a fragmentary cross-sectional view, taken on the line 15—15 of FIG. 10;

FIG. 16 is a fragmentary cross-sectional view, taken on the line 16—16 of FIG. 10;

FIG. 17 is a fragmentary cross-sectional view, taken on the line 17—17 of FIG. 10;

FIG. 18 is a fragmentary cross-sectional view, taken on the line 18—18 of FIG. 10;

FIG. 19 is a fragmentary cross-sectional view, taken on the line 19—19 of FIG. 22;

FIG. 20 is an elevational view, as indicated by the line 20—20 in FIG. 19;

FIG. 21 is a fragmentary cross-sectional view, taken on the line 21—21 of FIG. 19;

FIG. 22 is a top plan view, showing one of the magnetic turnover arms;

FIG. 23 is an elevational view, showing the power stacking cradles, as viewed in the direction indicated by the line 23—23 in FIG. 1;

FIG. 24 is a top plan view of the power stacking cradles, shown in FIG. 23;

FIG. 25 is a cross-sectional view, taken on the line 25—25 of FIG. 24;

FIG. 26 is a top plan view of the parts shown in FIG. 25;

FIG. 29 is a side elevational view of the stabilizer arm assembly;

FIG. 30 is an end elevational view of the stabilizer arm assembly;

FIG. 35 is an end view of the adjustable side roll;

FIG. 36 is a cross-sectional view, taken on the line 36—36 of FIG. 35;

FIG. 37 is an end elevational view of the tamping device, and

FIG. 38 is a side elevational view of the tamping device.

Figure 28:
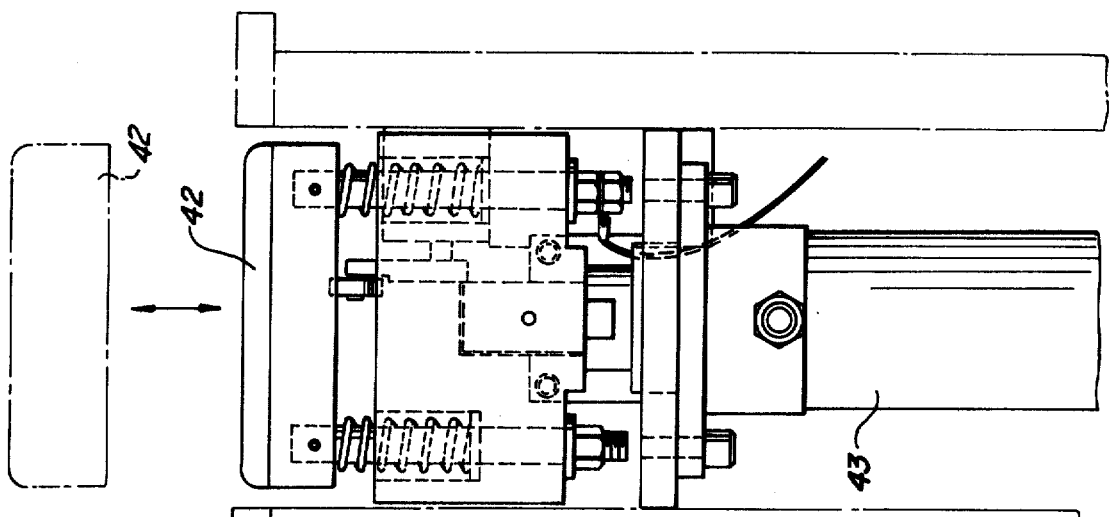
FIG. 28 is an end elevational view of the shape sensor device in its lowered position.

For convenience in understanding the invention, the stacker comprises various units or components, which may be generally described as lateral chain transfers, precharge carriages, stacking carriages, turnover arms, stacking cradles, fixed stops, disappearing stops, and power positioning stops. These, as well as several other components, will be separately described.

MODULAR CONSTRUCTION

The automatic stacker, as shown in FIGS. 1 and 2, is made up of a series of modules in side by side parallel arrangement, the upstream ends of these modules being at the lower end of FIG. 1, and the downstream ends at the upper end of FIG. 1.

In the particular stacker of the present application, a total of twelve modules is used, for the purpose of handling bars of 60 foot length.

The approximate center or division line between the twelve modules is indicated by the line A—A.

When bars longer than 30 feet and up to 60 feet in length are to be handled, clutch assemblies, indicated at B and C in FIG. 1, are activated, so that all twelve modules become operative for this purpose.

When 30 foot and shorter bars are to be handled by the stacker, the clutches B and C are disengaged, and only the six modules to the right of the line A—A in FIG. 1 are utilized for the handling of the bars, the six modules to the left of the line A—A being deactivated at such time.

In FIG. 1, due to limitations of space, and the necessity of maintaining a size scale which can be easily viewed, only two modules are shown at the right of the line A—A, it being understood, however, that the twelfth module (not seen) at the extreme right, is provided with drive assemblies identical with those used at the extreme left, and to which reference will presently be made.

As the bars are transferred toward the downstream ends of the modules and onto stacking cradles to be presently described, the movement of the bars or rather bundles, consisting of a stack of "charges" or layers, consisting of a predetermined number of bars in side by side contact with each other, proceeds in the direction indicated by the arrows E and F in FIG. 1, from a point which may be considered "north" at the left end of FIG. 1, to a point which may be considered as "south" at the right end of FIG. 1. The modules or sections at the left of line A—A may also be considered as the north sections, while those to the right of the line A—A may be considered as the south sections, this terminology being selected for purposes of convenience, when the sequence of steps in the operation of the stacker is hereinafter described.

Each of the modules comprises a pair of upstanding spaced channels 1 and 2 having the outer faces of their webs facing each other, the channels being supported on pedestals or piers 3 and 4, as shown in FIGS. 1 and 9, these piers, in turn, being supported on the floor G of the room in which the stacker is installed.

LATERAL CHAIN TRANSFERS

The lateral chain transfers are shown most clearly in FIGS. 1, 2, 9, 19 and 22, to which reference will be made in describing them.

Mounted between the channels 1 and 2 of each module, for rotation therebetween are idler sprockets 5, 6, 7 and 8, and a drive sprocket 9.

The drive sprockets 9 of all of the modules are interconnected by means of a drive shaft 10, the ends of which are connected to motors 11, which are supported on the two end modules, and serve to rotate the shaft 10.

The drive shaft 10 thus serves to drive endless chains 12, trained about the sprockets 5, 6, 7, 8 and 9, so that the upper runs of these chains, which constitute the "lateral chain transfers" are disposed slightly above the upper level of the channels 1 and 2, and in the direction indicated by the arrow C in FIG. 9.

The chains 12 function to transfer bars deposited singly thereon in the direction of the arrow C to which reference has just been made, and to which reference will again be made in connection with the operation of the stacker.

Mounted between the channels 1 and 2 of each module, at a position downstream of the sprockets 5, 6, 7 and 8, for rotation between the channels, are idler sprockets 13, 14 and 15 and a drive sprocket 16.

The drive sprockets 16 of all of the modules are interconnected by means of a drive shaft 17, the ends of which are connected to motors 18, which are supported on the two end modules, and serve to rotate the shaft 17.

The drive shaft 17 serves to drive endless chains 19, trained about the sprockets 13, 14, 15 and 16, so that the upper runs of these chains constitute a second series of lateral chain transfers, which are disposed at the same level as the upper runs of the chains 12 of the first series of lateral chain transfers, and in the direction indicated by the arrow D in FIG. 9.

FIXED STOPS

Mounted on each of the channels 2 are fixed stops 20, these stops extending above the upper flanges of the channels, and disposed at a position adjacent the downstream ends of the upper runs of the chains 12. These stops are shown most clearly in FIGS. 1, 8, 9 and 10, and serve a purpose to be described in connection with the operation of the stacker.

Mounted on either channel 1 or channel 2 of each module, are proximity sensors 21, which, as shown in FIGS. 10 and 18, are disposed at positions slightly rearwardly of the stops 20, and which will again be referred to in connection with the description of the operation of the stacker.

Skid rails 22 are also provided, alongside the precharge chains 12, which rails are of a length only sufficient to support a predetermined small number of bars, hereinafter referred to as a "charge." These rails slope downwardly and rearwardly away from the fixed stops 20, and, as will be later described, serve to prevent certain stop switches from being actuated until there is a sufficient number of bars present to overcome the friction of the skid rails.

DISAPPEARING STOPS

Disappearing stops 23 are also provided, which, as best seen in FIGS. 10, 11, 13, 14 and 15, are mounted for pivotal movement about stub shafts 24, supported by the channels 1, these stops being shown in operative position in these figures, but being capable of being swung, in a counterclockwise direction, as viewed in FIG. 10, to a position below the chain 19, by retraction of connecting rod 25, through hydraulic pressure applied to this rod in a hydraulic cylinder 26, which is pivotally connected, as at 27, to a bracket or support 28 mounted on the channel 1.

The function of these disappearing stops will be described in connection with the operation of the stacker.

POWER POSITIONING STOPS

Mounted on the channel 1, adjacent the downstream ends of the channel, are power positioning stops 29, which, as best seen in FIGS. 10, 12, 16 and 17, are mounted for pivotal movement about stub shafts 30 carried by the channel 1.

The function of these power positioning stops will presently be described.

PRECHARGE CARRIAGES

The precharge carriages are best seen in FIGS. 1, 2, 3, 4 and 8, and are generally indicated by reference numeral 31, and are pivotally connected to shafts 32, which are supported on brackets 33, which have rollers 34 mounted thereon, which are movable longitudinally along tracks or guides 35 which are supported by the channels 91 and 92.

The brackets 33 are interconnected with each other by means of connector shafts or couplings 36, so that all of the precharge carriages are actuated simultaneously, in their vertical pivoted motion about shafts 32.

The precharge carriages 31 are traversed horizontally by a common precharge drive, indicated by reference numeral 37, which rotates a shaft 38, and through lever arms 39 and 40, and in combination with the vertical drive described above, causes the precharge carriage 31 to traverse a path which originates below the level of the upper run of the chains 12, moves upwardly to the broken line position shown at the right in FIG. 8, continues forwardly to the broken line position shown at the left in FIG. 8, then downwardly to the solid line position shown in FIG. 8 and then rearwardly to its original or starting position.

This movement is a compound one, consisting of a longitudinal linear movement, along the tracks or guides 35, and a vertical movement, in which the precharge carriage 31 is moved from a starting position below the upper runs of the chains 12 just rearward of the fixed stops 20, then upwardly to lift a layer or "charge" of bars from the chains, then to a position forwardly of the fixed stop 20, then downwardly to a position below the upstream ends of the upper runs of the stacking chains 19, and then rearwardly to its starting position. This movement will be described in further detail in connection with the operation of the stacker.

Figure 27:
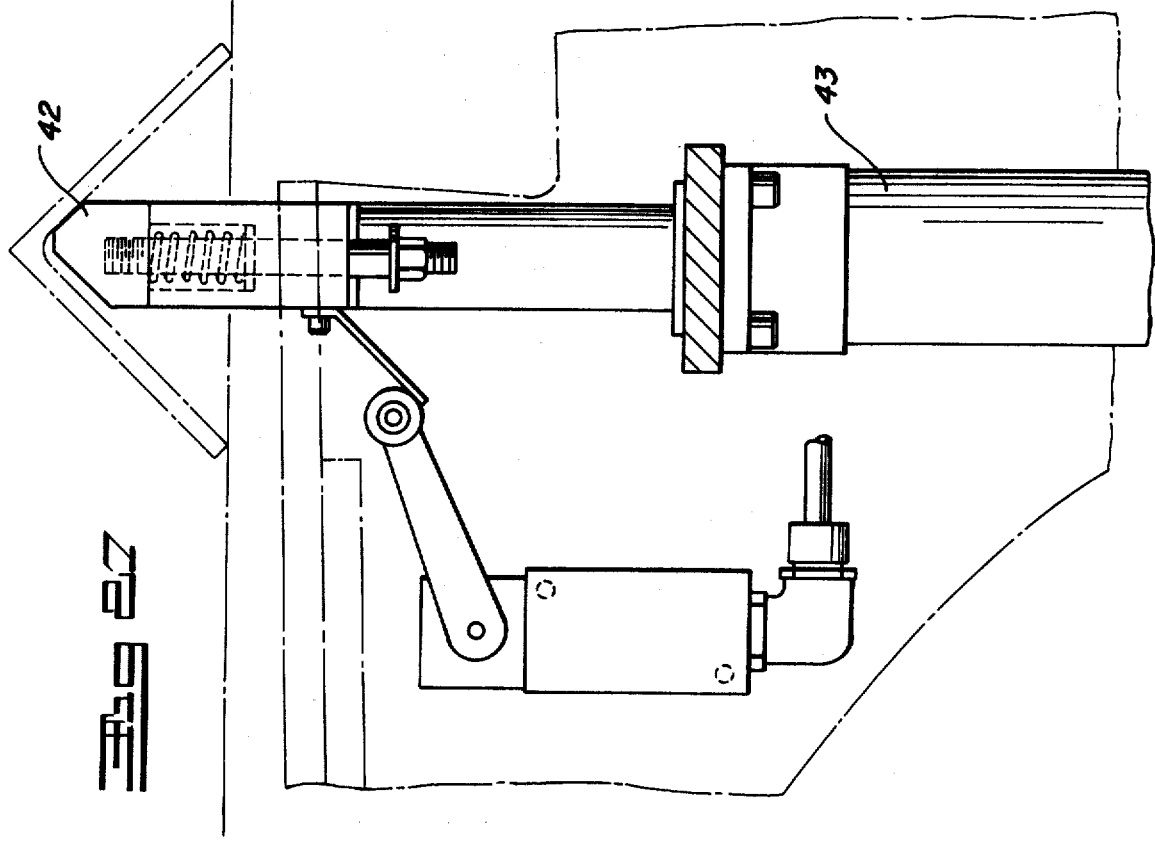
FIG. 27 is a fragmentary view showing the shape sensor device in elevated or raised position.

In FIGS. 8, 27 and 28, a proximity probe supported by the carriage 31 is indicated generally by reference numeral 42, which is actuated pneumatically through the medium of a pneumatic cylinder 43, this proximity probe serving a purpose to be presently described.

This proximity probe is a shaped sensor device designed to indicate that a row or charge of bars on the chains 12 is ready to be transferred from these chains onto the stacking chains 19.

STACKING CARRIAGES

The stacking carriages are best seen in FIGS. 1, 2, 3, 4, 5, 6, 7 and 8, being generally designated by reference numeral 44, and are generally similar in construction to the precharge carriages.

The carriages 44 are pivotally connected to shafts 45, which are supported on brackets 46, having rollers 47 mounted thereon, which are movable longitudinally along the tracks or guides 35, on which the rollers 34 are movable.

The brackets 46 are interconnected with each other by means of connector shafts or couplings 48, so that all of the stacking carriages are actuated simultaneously or in unison with each other, in their vertical pivoted motion about shafts 45.

The stacking carriages are actuated by a common stacking carriage drive indicated by reference numeral 49, which rotates a shaft 50, and through lever arm 51 and link 52, causes the stacking carriages to traverse a path between a position approximately indicated by the broken lines in FIG. 5 to the position approximately indicated by the solid lines in this figure, and then return to the broken line position.

This movement is a compound one, consisting of a longitudinal linear movement along the tracks or guides 35, and a vertical movement, in which the stacking carriage is moved from a starting position below the upper runs of the chains 19, just below the area at which a layer or charge of bars has been deposited onto these chains by the precharge carriages, then upwardly to lift this layer or charge of bars from the chains, then to a position forwardly of the chains 19, then downwardly to deposit the layer of bars on a stacking cradle, and then rearwardly to the starting position. This movement will be described in further detail in connection with the operation of the stacker.

TURNOVER ARMS

As an alternative to transfer of the bars to the stacking cradle by means of the stacking carriages which have been described, electromagnetic turnover arms may be used.

These electromagnetic turnover arms are best seen in FIGS. 1, 2, 9, 10, 19, 20, 21 and 22, and are generally indicated by reference numerals 53, and are mounted on a shaft 54, which is oscillated to move the arms through an arc 55 of approximately 180 degrees (see FIG. 9), from a position below the upper runs of the chains 19 to the position shown in FIG. 9, in which a layer or charge of bars carried by the magnetic arm can deposit the layer or charge in the stacking cradle.

This oscillation is effected hydraulically through the medium of a piston in a cylinder 56, a lever arm 57 keyed to a rock shaft 58, which is parallel with the shaft 54, and a gear segment 59, which is in mesh with a pinion 60 keyed to the shaft 54. The magnetic turnover arms are thus oscillated between their extreme positions by reciprocating movement of the piston in the cylinder 56.

STACKING CRADLE

The stacking cradle is seen most clearly in FIGS. 1, 4, 5, 9, 23, 24, 25, 26, 33, 34, 35 and 36.

The stacking cradle comprises a frame 61 having pairs of power-driven rollers 62 and 63 mounted thereon, each pair of rollers, as shown in FIG. 1, being aligned with the spaces between the modules to which reference has been made.

The rollers 62 and 63 are driven in the direction indicated by the arrows in FIG. 23, by means of a drive chain 64, so that bars deposited on the rollers by the stacking carriages or turnover arms are moved toward the south, as indicated by the arrows at the upper end of FIG. 1.

The chain drive unit for the rollers of the north group of modules is indicated by reference numeral 65 in FIG. 1.

For each pair of rollers 62 and 63, an upstanding stationary side roll 66 is provided, as well as an adjustable upstanding side roll 67, the rolls 67 being offset longitudinally from the rolls 66, as shown in FIGS. 23 and 24. The space between the row of rolls 66 and the row of rolls 67 determine the width of the bundle of bars which is deposited on the rollers 62 and 63.

For the purpose of adjusting the width of this space, means are provided for simultaneously moving all of the rolls 67 towards or away from the rolls 66, such means being shown in FIGS. 33, 34, 35 and 36, and comprising a screw 68, a roll-supporting carriage 69, and guide rods 70 and 71, along which the carriage 69 is guided in its movement.

Mounted on the stacking cradle frame 61, adjacent some of the rollers 63, are stabilizer arm assemblies, generally indicated by reference numeral 72, and shown in detail in FIGS. 29 and 30.

These stabilizer arm assemblies comprise an arm 73, which is actuated by a rocker 74, mounted on a stub shaft 75, and actuated by a piston 76, movable in a pneumatic cylinder 77. The function of this stabilizer device will be presently described.

For the purpose of raising or lowering the rolls 62 and 63, for reasons to be presently described, means are provided, which, as best seen in FIGS. 25 and 26, comprise hydraulically actuated masts 78, which are raised or lowered hydraulically by means of a piston movable in a piston 79.

TAMPING DEVICE

The tamping device is illustrated somewhat diagrammatically in FIG. 1, and in detail in FIGS. 37 and 38.

It comprises a tamper 80, which is actuated by a piston 81, through the medium of a pneumatic cylinder 82, the device being supported by a pedestal or floor-supported frame 83.

The device is disposed at the extreme south end of the machine, at a position opposite the downstream end of the last chain 19, and serves a purpose to which reference will be made in describing the operation of the machine.

POWER BRAKE

Figure 31:
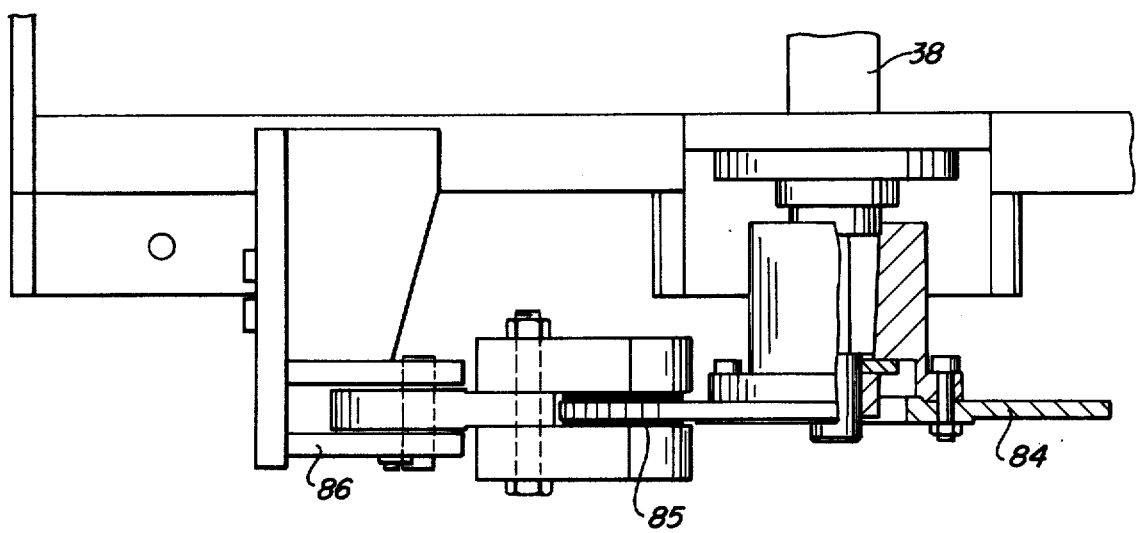
FIG. 31 is an end elevational view of the disc brake.
Figure 32:
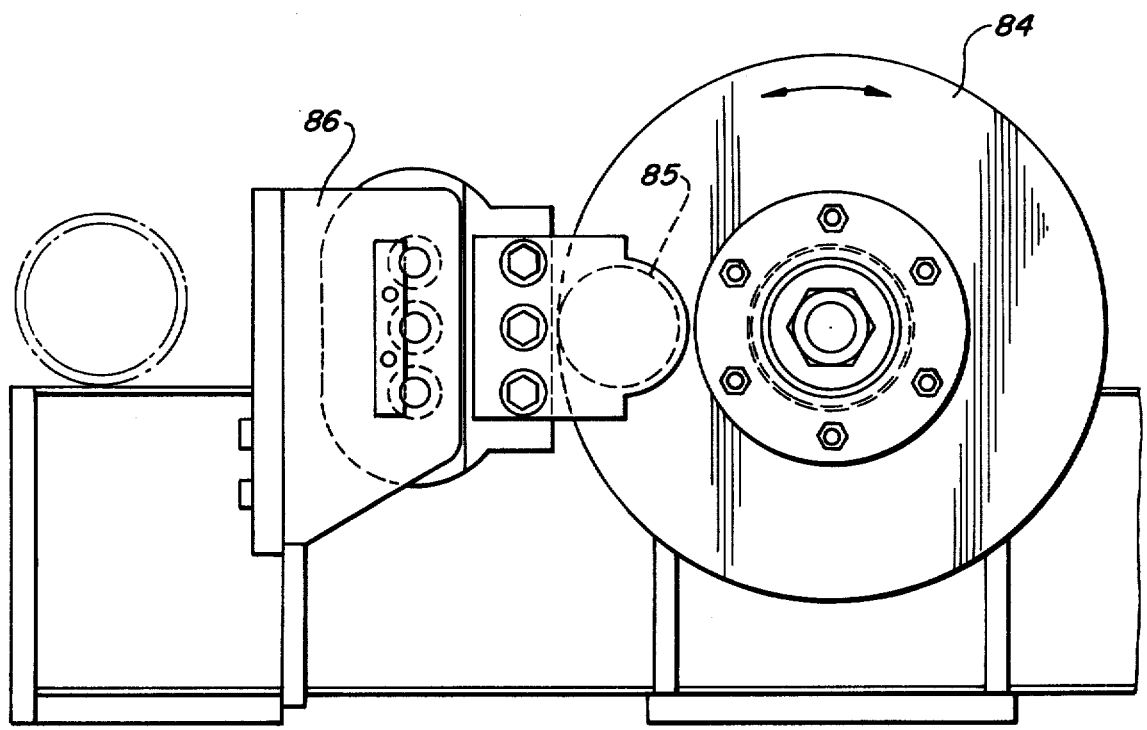
FIG. 32 is a side elevational view of the disc brake.
Figure 33:
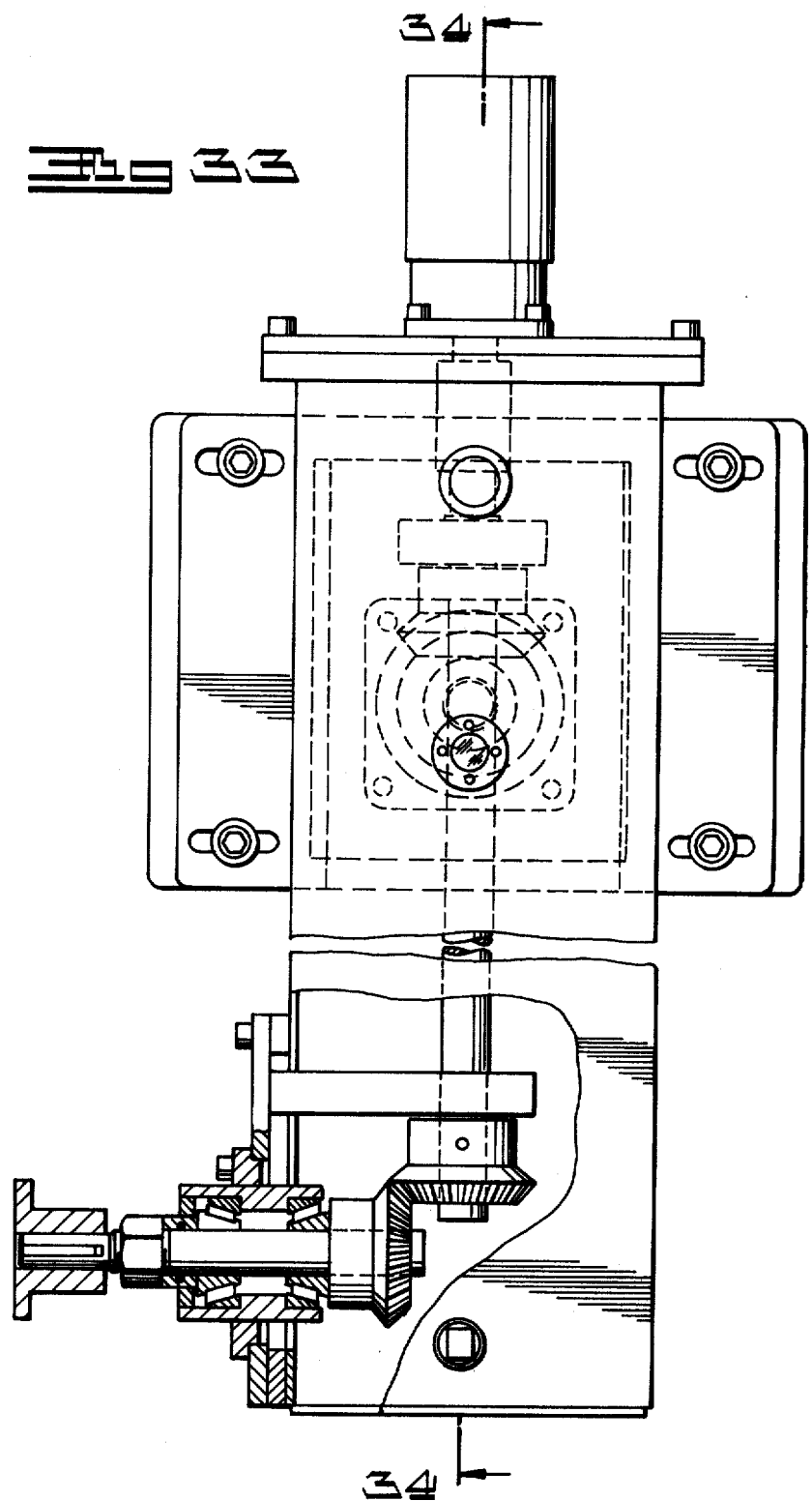
FIG. 33 is a fragmentary elevational view of the adjustable side roll synchronizing shaft, as viewed in the direction indicated by the line 33—33 in FIG. 24, with portions broken away to show some of the driving elements.
Figure 34:
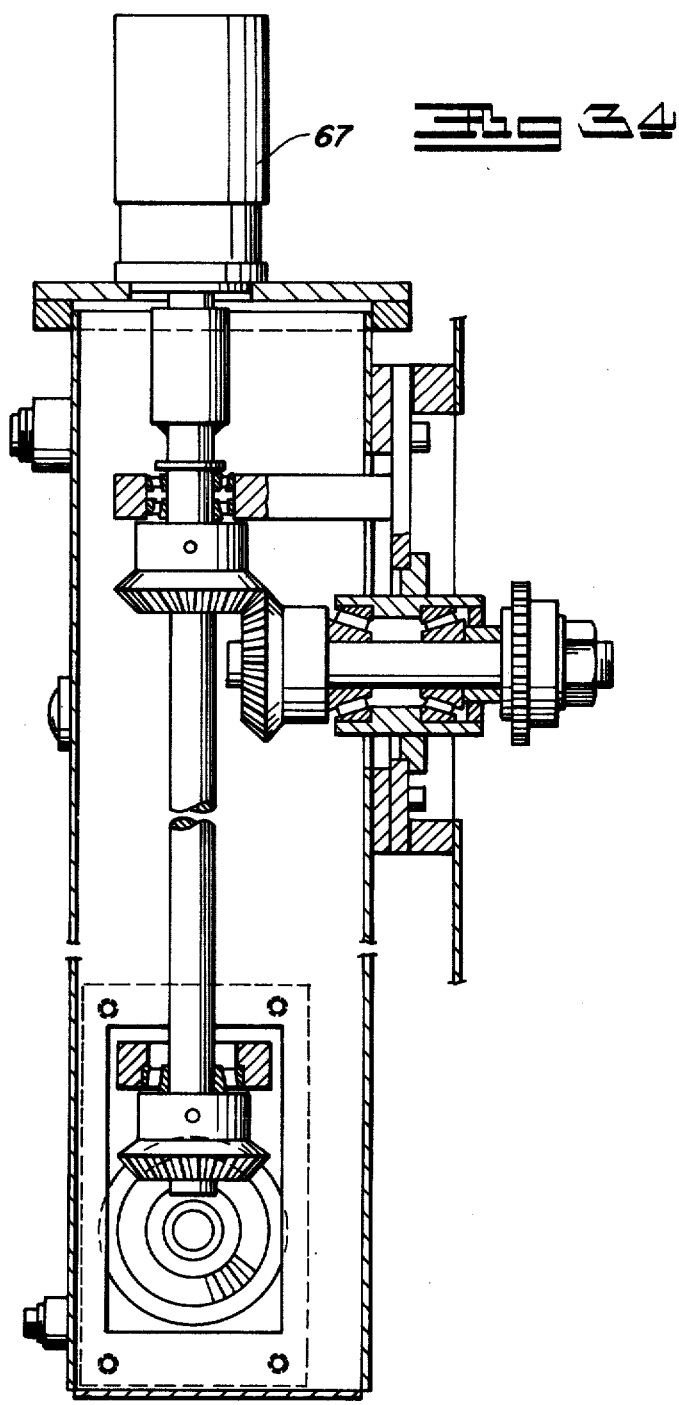
FIG. 34 is a cross-sectional view, taken on the line 34—34 of FIG. 33.

For the purpose of dynamically braking the precharge carriages at predetermined times, a power brake is provided, which is disposed at one end of the shaft 38, and which, as best seen in FIGS. 31 and 32, comprises a brake disc 84, and a braking component 85, which is mounted on a bracket or support 86.

The machine also includes various other elements or components, such as limit switches, electrical and hydraulic controls, power supply units, and other parts, which are of a standard commercially available nature, and which need not, therefore, be shown or described, except that reference thereto will be made in connection with the following description of the method of operation.

METHOD OF OPERATION

Although the machine is capable of handling a large variety of bars or rods of various shapes, such, for example, as angles, channels, and the like, the operation will be described, for convenience, in connection with the handling of angles having a length of 60 feet.

In the handling of such lengths, all twelve modules or units are employed, but if the angles are 30 feet in length, only the six modules or units at the south end or section of the machine are employed, those of the north section being rendered inoperative at such time, through the use of suitable clutching controls.

The angles are deposited, one at a time, on the chains 12, so that a substantially uniform distance is maintained between each angle, as the chains move. Means for thus depositing the angles do not form a part of this invention, and need not, therefore, be described.

When the first angle thus deposited approaches the fixed stops 20 (see FIG. 8), it triggers or activates a proximity sensor (not shown) which signals the precharge chains 12 to reduce their speed to what may be termed a "creep" speed, so as to prevent the angles from over-riding one another when contact is made with the stops 20. Moreover, as the charge of angles nears the fixed stops, the angles will rise from the chains and onto the skid rails 22 (see FIG. 10), these rails being of a length sufficient to contain or support only a limited number of angles, and serving to prevent the stop switches from being actuated until a sufficient number of angles is present to overcome the friction of the rails.

The skid rails 22 can be lowered at any time by depressing a lighted push button (not shown).

After the first angle comes into contact with the stops 20, the chains 12 continue to move for a period of time in order to compact the charge, that is to say, to bring all of the angles in the charge into intimate contact with each other.

The chains 12 are then stopped, and the proximity probe 42 (see FIGS. 8, 27 and 28) is raised. If the proximity probe comes into contact with the charge, the probe will lower, and the pre-charge transfer arms 31 will rise for the purpose of transferring the charge to the chains 19. If, however, such contact is not made by the probe 42, the probe will continue its upward movement until contact is made with a limit switch (not shown), thereby informing the operator that a sufficient number of angles to constitute a full charge is not present for transfer to the chains 19, and activating a signal for the chains 12 to go through another compacting cycle. Upon completion of this cycle, the probe 42 will again rise, and if contact is made with the charge, transfer of the charge will ensue, and if contact is not made, the compacting cycle will be repeated.

Assuming that the charge of angles is in proper condition to be transferred to the chains 19, the precharge transfer arms 31 will move to their forward position, as indicated by the broken lines at the left in FIG. 8, it being noted that as the arms approach this position, their speed is reduced, so that when they reach this position, they will stop without shifting of the load or charge thereon.

If a proximity sensor (not shown) is clear, the arms 31 will lower to the solid line position shown at the left in FIG. 8, so that the charge of angles thereon will be deposited on the chains 19, the chains, in effect, stripping the charge from the arms. The arms 31 will then be retracted to their original or pick-up position.

The stacking chains 19 will move the charge forwardly for a predetermined period of time, during which the charge comes into contact with the stops 23 (see FIGS. 10 and 11), against which the charge is further compacted. At the end of this period, the stops 23 will lower, permitting the chains to advance the charge, if the stacker positioning area, i.e., the area just to the left of the stops 23 in FIG. 10, is clear, until contact of the charge is made with the positioning stops 29 (see FIGS. 10 and 12).

Incorporated within these stop structures 29 are limit switches (not shown), simultaneous actuation of the selected combination of which will cause the chains 19 to stop after a short period of time. This period of time is allotted for final compacting of the charge.

Following this final compacting of the charge, the tamping devide 80, shown in FIGS. 1, 37 and 38, is used to engage and push the ends of any angles in the charge which protrude beyond the ends of other angles in the charge, so as to align the charge ends, preparatory to transfer of the charge to the stacking cradles.

The charge will normally be transferred to the stacking cradles by means of the stacking carriages 44.

For this purpose, the arms of these carriages will rise, lifting the charge from the chains 19, carrying the charge to the forward position shown in FIGS. 1, 2, 3, 4 and 5, and then lowering the charge into the cradles, after which the carriage arms are retracted, resulting in the charge being wiped off onto the previous charge or layer of angles which has previously been deposited in the cradles.

During the forward movement of the carriages, a limit switch (not shown) is tripped, reducing the speed of the carriages prior to stopping. The speed of the carriages is also reduced near the end of the return of the carriages to their initial position.

When the charge consists of angles, as described, the stabilizing devices 72, shown in FIGS. 24, 29 and 30, are utilized as an aid for depositing and aligning the angles.

The magnetic turnover arms 53 (see FIGS. 1, 2, 9, 19, and 22) are used, when an inverted off-set, or a top-off layer or charge is required to be deposited on the layers previously deposited in the cradles. At the end of the tamping cycle, to which reference has been made, the magnets of these turnover arms are energized to hold the layer or charge and the turnover arms rotated 180°, after which the layer or charge is released by reversing the flow of current in the magnets for a short period of time. Following this, the turnover arms return to their original position. The movement of the magnetic arms in both directions is decelerated through the use of limit switch controls.

As stated, the magnetic turnover arms are used whenever a layer of angles or other elements of the charge is required to be inverted. Since the magnets have a fixed center of rotation, the layers or charges to be inverted must be positioned exactly above the magnets. This is achieved through the use of the positioning stops which have been previously described.

When the first layer of angles is deposited on the cradle rolls 62 and 63, these rolls are in fully raised position, as signalled by a limit switch. Two photo sensors (not shown) are utilized to regulate the height position of the rolls. When a layer of angles is placed on the rolls, it breaks the photo beams, causing the rolls to lower until the beams can be restored. When a bundle is completed, the rolls descend to their lower position, and the bundle is now ready for the strapping and run-out cycles to begin.

The adjustable rolls 67 of the stacking cradles are initially set in their approximate position, determined by the width of the charge, by the operator before a charge is delivered to the cradles. When the first layer is deposited, the operator can then make final adjustments, from his control panel, of the adjustable rolls 67.

As the bundle is moved along the rolls 62 and 63 of the stacking cradles, it is stopped at predetermined intervals, to permit strapping or banding to be applied to the bundle, to tie all the angles of the bundle together.

For this purpose, a series of spaced automatic strapping machines or strappers, indicated by reference numeral 87 in FIG. 1, is positioned alongside the stacking cradle.

These strapping machines are programmed to operate in conjunction with other operations of the machine, and function to feed out strapping from a roll of strapping material, apply tension to the strap, crimp and cut the strapping.

When the strapping cycle is completed, that is to say, the last strap has been applied, the bundle is driven upstream onto a roll-out table, and the cradle is then readied for the next bundle.

This automatic stacking machine is compatible with several types of commercially-available automatic flat-strapping or wire-tying machines.

Having thus described my invention, I claim:

1. In a machine of the character described, the combination of first endless conveyor means for conveying a series of elongated bars in spaced relation to each other in a direction perpendicular to the direction of elongation of said bars, stationary stop means disposed adjacent the forward ends of said conveyor means and adapted for abutment by the first bar in said series to cause said first bar to stop, and each succeeding bar in the series to come into abutment with the preceding bar, whereby to close or substantially close the spacing between the bars, and provide a layer of bars in side-by-side relation, means for selecting a predetermined number of bars in the layer to constitute a charge, said means for selecting a predetermined number of bars comprising a proximity sensor means for detecting the presence of the last bar in the charge, said stationary stop means being immovable by pressure exerted by said layer of bars in the direction of movement of said bars, second endless conveyor means disposed downstream of said first conveyor means for conveying said charge away from said first conveyor means, orbitally moving means for bodily transferring said charge from said first endless conveyor means onto said second endless conveyor means, means responsive to the means for selecting a predetermined number of bars for actuating said orbitally moving means, and second stop means disposed downstream of said stationary stop means and for abutment by said charge to cause any remaining spacing between the bars of the charge to be fully closed.

2. A machine, as defined in claim 1, including a third stop means downstream of said second stop means and against which the charge is brought to position the charge for a tamping operation.

3. A machine, as defined in claim 1, including second transfer means for bodily removing said charge from said second conveyor means, after the spacing between the bars of the charge has been fully closed.

4. A machine, as defined in claim 2, including means for tamping the ends of any bars which protrude beyond the ends of other bars in the charge, whereby to cause alignment of the ends of said protruding bars with said other bars.

5. A machine, as defined in claim 1, wherein said orbitally moving means comprises carriages mounted for pivotal movement about shafts which are supported by brackets having rollers mounted thereon and movable longitudinally along tracks or guides.

6. A machine, as defined in claim 5, including means for effecting said orbital movement of the carriages, said means comprising a power driven shaft, lever arms interconnecting said power driven shaft with said first-named shaft, an air-powered piston rod and a lever actuated by said piston rod.

7. A machine as defined in claim 1 including means for retracting said second stop means.

* * * * *